US012615639B2

(12) United States Patent
Salah et al.

(10) Patent No.: US 12,615,639 B2
(45) Date of Patent: Apr. 28, 2026

(54) METHODS FOR DYNAMIC AND STATIC CROSS-CARRIER PUCCH SIGNALING AND CONFIGURATION IN MOBILE COMMUNICATIONS

(71) Applicant: MediaTek Singapore Pte. Ltd., Singapore (SG)

(72) Inventors: Abdellatif Salah, Cambridge (GB); Mohammed S Aleabe Al-Imari, Cambridge (GB); Jozsef Gabor Nemeth, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 374 days.

(21) Appl. No.: 18/033,285

(22) PCT Filed: Oct. 21, 2021

(86) PCT No.: PCT/CN2021/125162
§ 371 (c)(1),
(2) Date: Apr. 21, 2023

(87) PCT Pub. No.: WO2022/083671
PCT Pub. Date: Apr. 28, 2022

(65) Prior Publication Data
US 2023/0389026 A1 Nov. 30, 2023

Related U.S. Application Data

(60) Provisional application No. 63/094,369, filed on Oct. 21, 2020.

(51) Int. Cl.
*H04W 72/21* (2023.01)
*H04L 5/00* (2006.01)
(Continued)

(52) U.S. Cl.
CPC ............. *H04W 72/21* (2023.01); *H04L 5/001* (2013.01); *H04L 5/0064* (2013.01); *H04W 72/02* (2013.01); *H04W 72/232* (2023.01)

(58) Field of Classification Search
CPC ... H04W 72/21; H04W 72/02; H04W 72/232; H04W 72/23; H04L 5/001; H04L 5/0064; H04L 5/0058; H04L 5/0055; H04L 1/1887
See application file for complete search history.

(56) References Cited

U.S. PATENT DOCUMENTS

| | | | |
|---|---|---|---|
| 8,818,441 B2 | 8/2014 | Haim et al. | |
| 11,985,670 B2 * | 5/2024 | Panteleev | H04W 72/23 |

(Continued)

FOREIGN PATENT DOCUMENTS

| | | |
|---|---|---|
| CN | 102355733 A | 2/2012 |
| CN | 102577219 A | 7/2012 |

(Continued)

OTHER PUBLICATIONS

European Patent Office, Extended European Search Report in European Patent Application No. 21882086.8, Sep. 9, 2024.

(Continued)

*Primary Examiner* — Brian T O Connor
(74) *Attorney, Agent, or Firm* — Andy M. Han; Han IP PLLC

(57) ABSTRACT

Various solutions for dynamic and static cross-carrier physical uplink control channel (PUCCH) signaling and configuration in mobile communications are described. An apparatus, implementable in a UE, selects a component carrier (CC) from a plurality of CCs with a static approach or a dynamic approach. The UE then performs a PUCCH transmission to a network using the selected CC.

18 Claims, 6 Drawing Sheets

100

(51) Int. Cl.
   *H04W 72/02*          (2009.01)
   *H04W 72/232*         (2023.01)

(56)                    References Cited

U.S. PATENT DOCUMENTS

| | | | | |
|---|---|---|---|---|
| 12,317,233 | B2 * | 5/2025 | Ganesan | H04L 5/0053 |
| 12,413,341 | B2 * | 9/2025 | Salah | H04W 72/23 |
| 12,432,737 | B2 * | 9/2025 | Sosnin | H04L 5/0044 |
| 2015/0305016 | A1 * | 10/2015 | Dai | H04L 5/0098 |
| | | | | 370/280 |
| 2016/0330010 | A1 * | 11/2016 | Qin | H04L 1/1812 |
| 2021/0168852 | A1 * | 6/2021 | Panteleev | H04L 5/0055 |
| 2022/0123902 | A1 * | 4/2022 | Panteleev | H04L 1/1887 |
| 2022/0150950 | A1 * | 5/2022 | Islam | H04L 1/1812 |
| 2023/0328727 | A1 * | 10/2023 | Salah | H04L 5/0055 |
| | | | | 370/329 |
| 2023/0379095 | A1 * | 11/2023 | Kittichokechai | H04L 5/0035 |

FOREIGN PATENT DOCUMENTS

| | | | |
|---|---|---|---|
| CN | 104812007 | A | 7/2015 |
| WO | WO 2013075314 | A1 | 5/2013 |

OTHER PUBLICATIONS

Mediatek Inc., "On UE feedback enhancements for HARQ-ACK", 3GPP TSG RAN WG1 Meeting #102-e, R1-2005633, e-Meeting, Aug. 17-28, 2020.
China National Intellectual Property Administration, First Office Action in China Patent Application No. 202180071107.3, Mar. 26, 2025.

\* cited by examiner

100

WIRELESS NETWORK
120

125

110

• NETWORK NODE 125 AND USER EQUIPMENT (UE) 110 PERFORM DYNAMIC AND STATIC (OR SEMI-STATIC) CROSS-CARRIER PHYSICAL UPLINK CONTROL CHANNEL (PUCCH) SIGNALING AND CONFIGURATION

600

SELECT, BY A PROCESSOR OF AN APPARATUS IMPLEMENTED IN A
USER EQUIPMENT (UE), A COMPONENT CARRIER (CC) FROM A
PLURALITY OF CCS
610

PERFORM, BY THE PROCESSOR, A PHYSICAL UPLINK CONTROL
CHANNEL (PUCCH) TRANSMISSION TO A NETWORK USING THE
SELECTED CC
620

METHODS FOR DYNAMIC AND STATIC CROSS-CARRIER PUCCH SIGNALING AND CONFIGURATION IN MOBILE COMMUNICATIONS

CROSS REFERENCE TO RELATED PATENT APPLICATION

The present disclosure is part of U.S. National Stage filing of International Patent Application No. PCT/CN2021/125162, filed 21 Oct. 2021, which is part of a non-provisional application claiming the priority benefit of U.S. Patent Application No. 63/094,369, filed on 21 Oct. 2020, the content of which being incorporated by reference in its entirety.

TECHNICAL FIELD

The present disclosure is generally related to mobile communications and, more particularly, to techniques for dynamic and static cross-carrier physical uplink control channel (PUCCH) signaling and configuration in mobile communications.

BACKGROUND

Unless otherwise indicated herein, approaches described in this section are not prior art to the claims listed below and are not admitted as prior art by inclusion in this section.

In wireless communications, such as mobile communications under the 3rd Generation Partnership Project (3GPP) specification(s) for 5th Generation (5G) New Radio (NR), while Ultra-Reliable Low-Latency Communication (URLLC) deployment on time-division duplexing (TDD) in sub-6 GHz frequency bands can enjoy wider bandwidth availability, there remains the challenge of non-optimal latency performance dominated by TDD uplink (UL) and downlink (DL) configurations. For instance, in outdoor wide-area deployments, TDD patterns tend to favor UL-heavy or DL-heavy traffic; however, these TDD patterns tend to lead to extra delay, thereby compromising both latency and reliability requirements. In indoor local deployments, although latency-friendly patterns could be deployed, such patterns tend to be more suitable for symmetric traffic. URLLC traffic could be mixed with enhanced Mobile Broadband (eMBB)-like traffic for indoor deployment. Moreover, as more guard time gaps would be needed to switch between UL and DL transmissions, spectral efficiency would be reduced. In case that a legacy TDD operator is unwilling to change the TDD UL/DL configuration, then alternative options would be necessary. For instance, inter-band TDD carrier aggregation (CA) could be exploited to mitigate the extra alignment delay introduced on a TDD carrier due to UL/DL patterns. In view of the above, an issue under further study in 3GPP is related to how to support PUCCH carrier switching in a PUCCH group. Therefore, there is a need for a solution of dynamic and static cross-carrier PUCCH signaling and configuration in mobile communications.

SUMMARY OF THE INVENTION

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the issue(s) described herein. More specifically, various schemes proposed in the present disclosure are believed to provide solutions for dynamic and static cross-carrier PUCCH signaling and configuration in mobile communications. For instance, dynamic selection of the component carrier (CC) used for PUCCH transmission may help reducing the latency for CA operation with two or more inter-band carriers having different TDD patterns. Moreover, utilization of the nearest UL transmission opportunity on different CCs for PUCCH transmission may help reduce the hybrid automatic repeat request (HARQ) feedback delay.

In one aspect, a method may involve a UE selecting a CC from a plurality of CCs with a static approach or a dynamic approach. The method may also involve the UE performing a PUCCH transmission to a network using the selected CC.

It is noteworthy that, although description provided herein may be in the context of certain radio access technologies, networks and network topologies such as 5G/NR mobile communications, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, Internet-of-Things (IoT), Narrow Band Internet of Things (NB-IoT), Industrial Internet of Things (IIoT), vehicle-to-everything (V2X), and non-terrestrial network (NTN) communications. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to dynamic and static cross-carrier PUCCH signaling and configuration in mobile communications. According to the present disclosure, a number of possible solutions may be implemented separately or jointly. That is, although these possible solutions may be described below separately, two or more of these possible solutions may be implemented in one combination or another.

Figure 1:
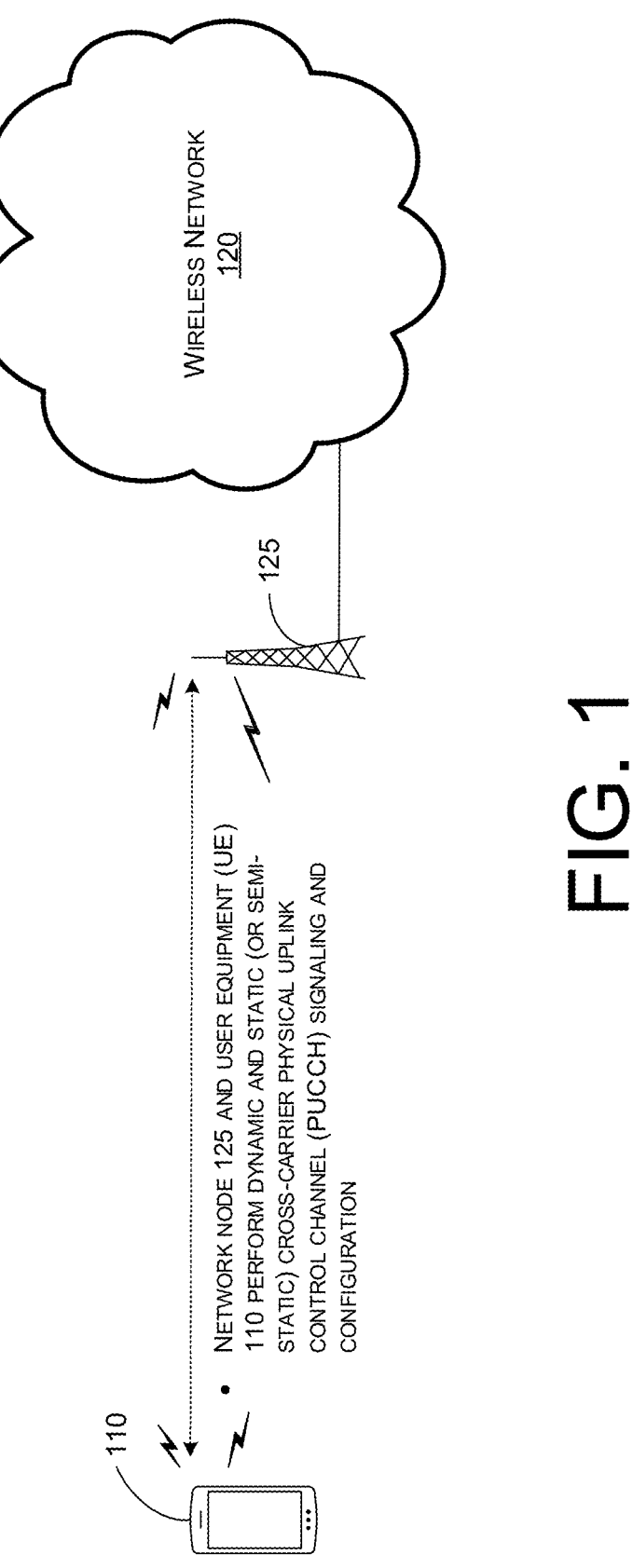
FIG. 1 is a diagram of an example network environment in which various proposed schemes in accordance with the present disclosure may be implemented.

FIG. 1 illustrates an example network environment 100 in which various solutions and schemes in accordance with the present disclosure may be implemented. Referring to FIG. 1, network environment 100 may involve a user equipment (UE) 110 in wireless communication with a wireless network 120 (e.g., a 5G NR mobile network and/or another type of network such as a LTE network, a LTE-Advance network, a NB-IoT network, an IoT network, an IIoT network and/or an NTN). UE 110 may be in wireless communication with wireless network 120 via a base station or network node 125 (e.g., an eNB, gNB or transmit-receive point (TRP)). In network environment 100, UE 110 and wireless network 120 may implement various schemes pertaining to dynamic and static cross-carrier PUCCH signaling and configuration in mobile communications, as described below.

Figure 2:
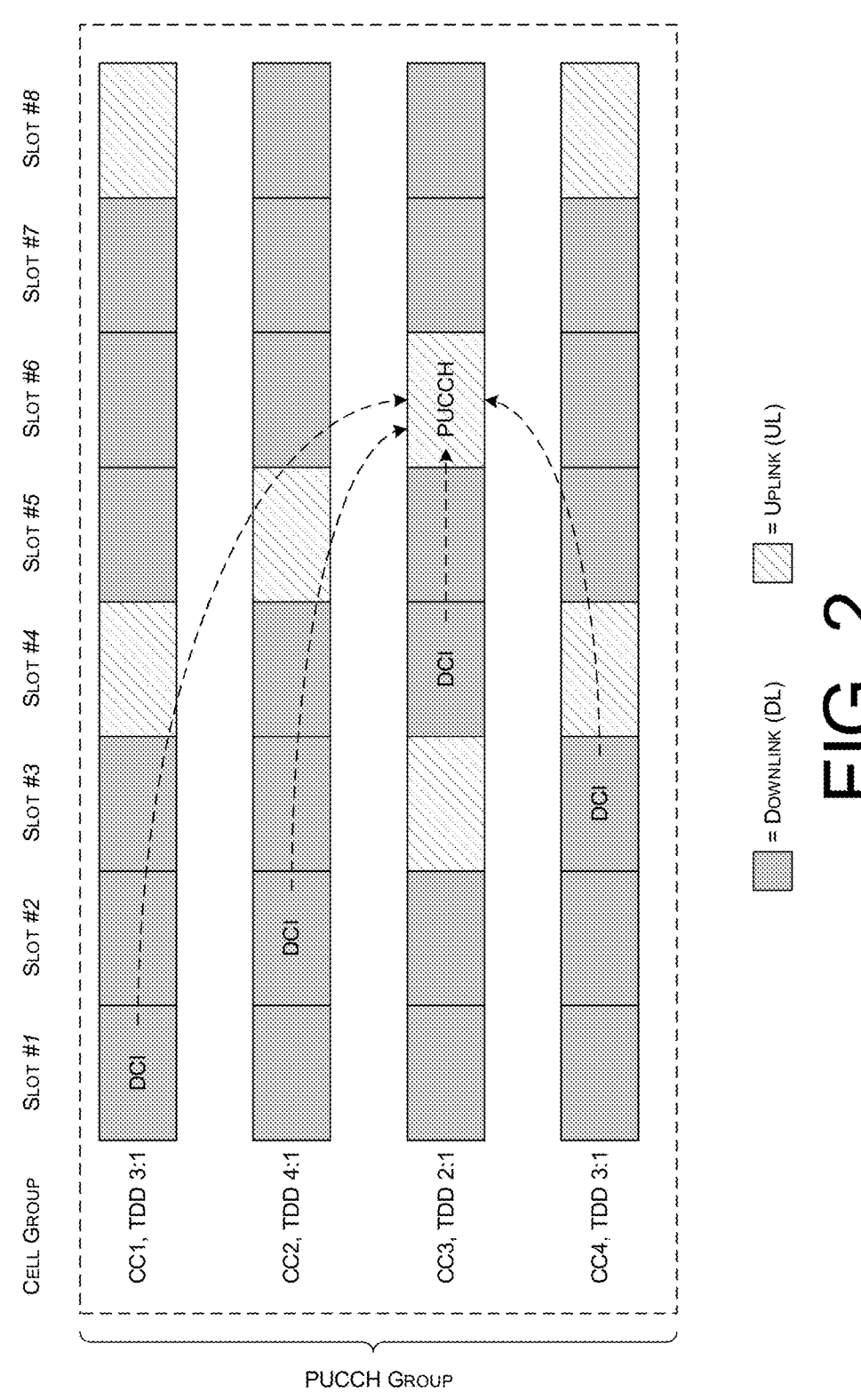
FIG. 2 is a diagram of an example scenario under a proposed scheme in accordance with the present disclosure.

FIG. 2 illustrates an example scenario 200 of dynamic and static carrier selection for PUCCH transmission under a proposed scheme in accordance with the present disclosure. In the example shown in scenario 200, a cell group includes multiple CCs such as CC1, CC2, CC3 and CC4, each configured with a respective TDD pattern. For instance, CC1 may have a TDD pattern in which 3 consecutive DL time slots are followed by 1 UL time slot (denoted as "CC1, TDD 3:1" in FIG. 2). Similarly, CC2 may have a TDD pattern in which 4 consecutive DL time slots are followed by 1 UL time slot (denoted as "CC2, TDD 4:1" in FIG. 2). Likewise, CC3 may have a TDD pattern in which 2 consecutive DL time slots are followed by 1 UL time slot (denoted as "CC3, TDD 2:1" in FIG. 2). Moreover, CC4 may have a TDD pattern in which 3 consecutive DL time slots are followed by 1 UL time slot (denoted as "CC4, TDD 3:1" in FIG. 2). As shown in FIG. 2, multiple dynamic signaling (e.g., downlink control information (DCI)) may be received by UE 110 from wireless network 120 on multiple CCs including CC1, CC2, CC3 and CC4. Moreover, the multiple DCIs received on the multiple CCs may point to a same available UL time slot (e.g., on CC3) for PUCCH transmission. Under the proposed scheme, there may be several approaches (static and dynamic) regarding how to select a carrier for PUCCH transmission in scenario 200, as described below.

A first approach may be a static approach, and there may be multiple options under this approach. In a first option, a carrier with the smallest carrier index may be selected. Accordingly, the PUCCH load may be on a specific carrier, and this may be efficient in case that the carrier has the most UL-friendly TDD pattern. In a second option, a carrier with the earliest UL opportunity or PUCCH resource in a PUCCH resource set may be selected. However, one issue associated with this option is that the resources in the PUCCH resource set could be aligned across some carrier boundaries. Another issue is that simultaneous HARQ acknowledgement (HARQ-ACK) codebooks (CBs) might select the same resources. In a third option, a new priority index may be defined (e.g., a primary PUCCH carrier and then a secondary PUCCH carrier, and so on). For instance, carrier #k may be selected in case it is available on slot #n, otherwise carrier #k+1 on slot #n may be selected, with k being a priority order for PUCCH carriers.

A second approach may be a dynamic approach with DCI. Under the proposed scheme, support of PUCCH carrier switching may be based on a dynamic indication in DCI scheduling a PUCCH and semi-static configuration. The dynamic indication and/or semi-static configuration may be subject to separate UE capabilities. The semi-static PUCCH carrier switching configuration operation may be based on radio resource control (RRC)-configured PUCCH cell timing pattern of applicable PUCCH cells, with support of PUCCH carrier switching across cells with different numerologies. There may be multiple options under this approach. In a first option, a last DCI from a base station (e.g., network node 125) may be used to select the transmission carrier for a specific HARQ-ACK codebook. This may allow possibility for PUCCH carrier overriding but may result in constraint on implementation. In a second option, a PUCCH carrier selection deadline may be defined, and a last DCI before the deadline may be used to select the carrier. In a third option, a first DCI from the base station may be used to select the PUCCH carrier, and the carrier may not be changed afterwards. As TDD patterns are static, there is no need to change the carrier in the middle of a codebook construction (unless fast fading and the UL channel quality is also to be taken into consideration by the base station). In the third options, there would be no overriding of the PUCCH carrier index as the first DCI is used to select the PUCCH carrier.

Figure 3:
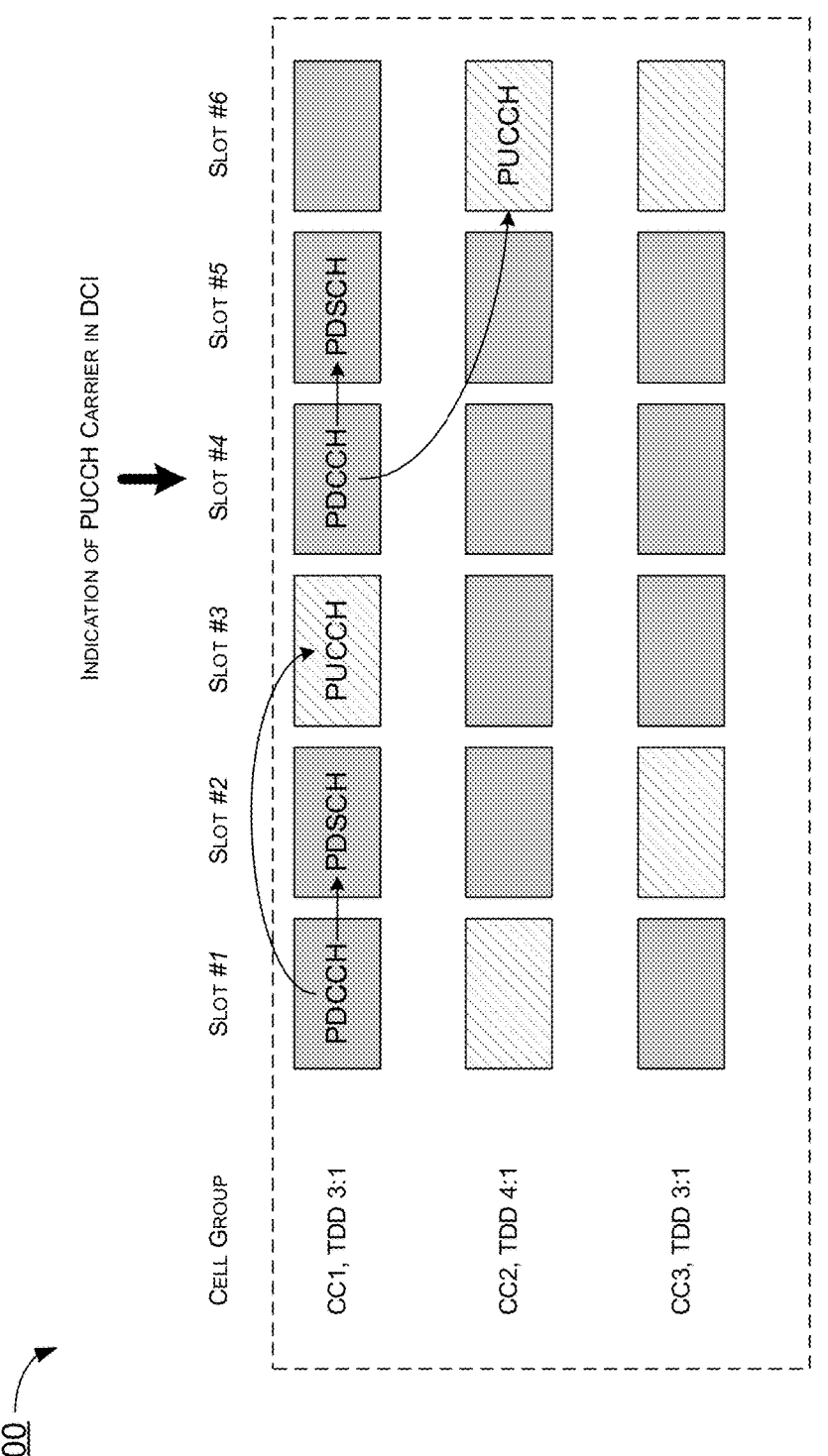
FIG. 3 is a diagram of an example scenario under a proposed scheme in accordance with the present disclosure.
Figure 4:
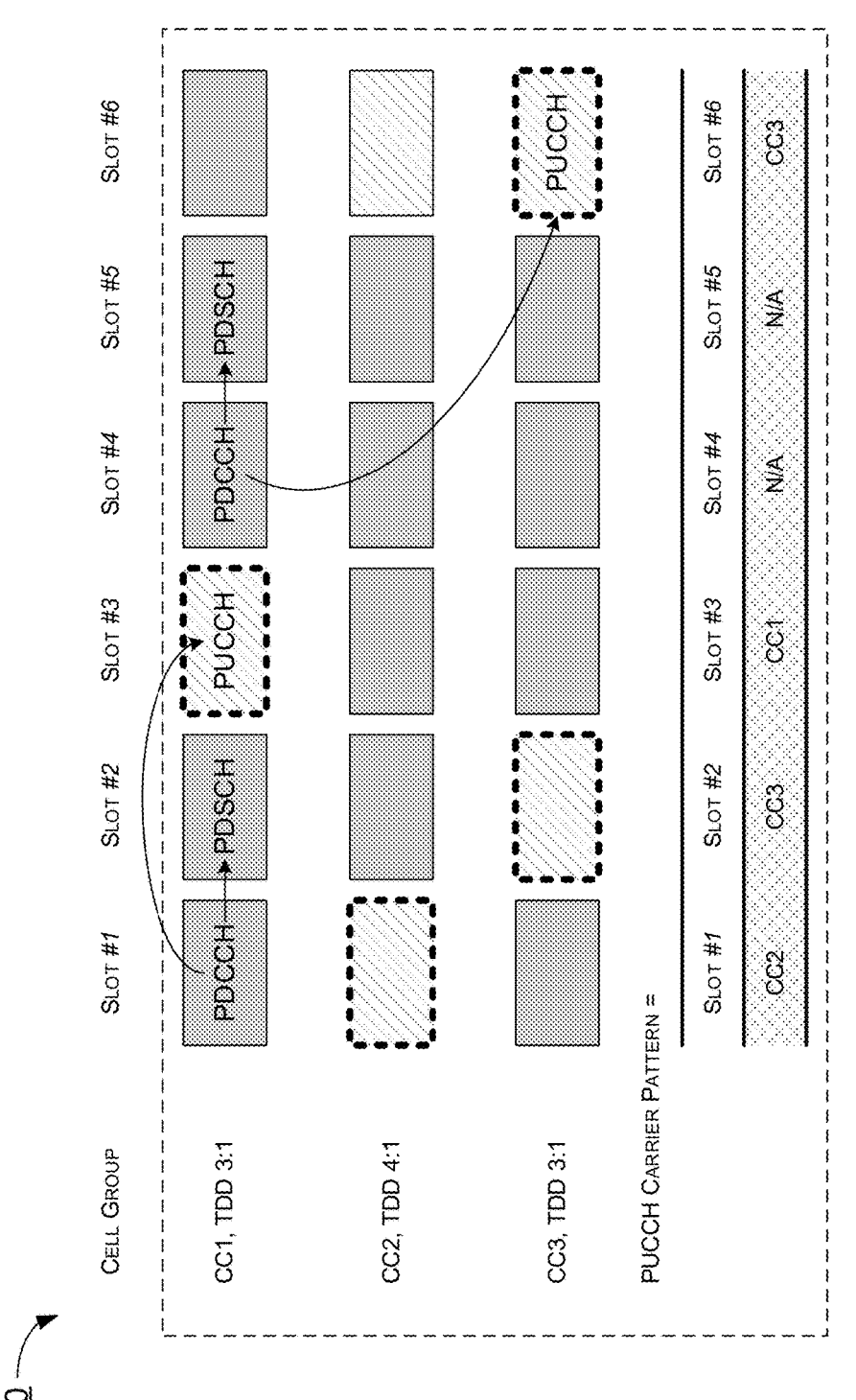
FIG. 4 is a diagram of an example scenario under a proposed scheme in accordance with the present disclosure.

FIG. 3 illustrates an example scenario 300 under the proposed scheme. FIG. 4 illustrates an example scenario 400 under the proposed scheme. Specifically, scenario 300 shows an example of dynamic indication in DCI scheduling a PUCCH, with the strengths of flexibility, dynamic load balancing, and frequency-selective gain. Moreover, scenario 400 shows an example of semi-static PUCCH cell timing pattern, with the strength of less overhead in dynamic signaling.

In Release 16 (Rel-16) of the 3GPP specification, PUCCH configuration is defined per carrier, per bandwidth part (BWP) and per HARQ-ACK codebook. Since only one BWP is active per carrier and there is only one PUCCH carrier per PUCCH group, at most two PUCCH configurations per PUCCH group could be simultaneously active, with one being for high-priority (HP) codebook(s) and the other for low-priority (LP) codebook(s). Under a proposed scheme in accordance with the present disclosure, there may be multiple approaches to PUCCH configuration. A first approach may be utilized when multiple PUCCH carriers are defined per PUCCH group (e.g., CC1, CC2, CC3 and CC4 in scenario 200 may be defined as one PUCCH group), and there may be multiple options under this approach. In a first option, a PUCCH configuration may be defined per PUCCH carrier. This option may be relatively simple in implementation but some information may be redundant or conflicting (e.g., k1 list per DCI format). In a second option, the PUCCH configuration may be inherited from a primary PUCCH carrier. This option may also be relatively simple in implementation but some information may be carrier-specific (e.g., PUCCH format, PUCCH resources, power control, and so on). In a third option, two levels of PUCCH configuration may be defined, namely: per PUCCH group and per PUCCH carrier.

Under the proposed scheme, a second approach may have multiple options to address multiple PUCCH configurations in a PUCCH group. In a first option, new parameter structures may be defined per HARQ codebook to gather the redundant and/or conflicting settings (e.g., k1 list). This configuration may apply to the codebook regardless of the PUCCH carrier. In a second option, a new PUCCH-configuration-common parameter structure may be defined per PUCCH group to gather any PUCCH configurations common to the PUCCH group. In a third option, the PUCCH configuration of the PUCCH carrier may be used. As k1 list could be different, this option may require checking to see if k1 is used in the codebook construction. In both the first and second options, information could be re-configured for any new BWP selected.

It is noteworthy that, in an event that PUCCH carrier switching based on dynamic indication in DCI scheduling a PUCCH is supported, there may be several options with respect to PUCCH resource configuration. For instance, the PUCCH resource configuration may be the same for all candidate cells (e.g., independent of the subcarrier spacing (SCS)). Alternatively, the PUCCH resource configuration may be independently configured per candidate cell. Alternatively, the PUCCH resource configuration may be per candidate cell with a combination of 'per carrier' and 'per PUCCH group' parameters. Alternatively, the PUCCH resource configuration may be configured per SCS of the candidate cells (e.g., same SCS candidate cells may have the same PUCCH resource configuration).

Under a proposed scheme in accordance with the present disclosure, there may be multiple approaches to HARQ-ACK codebook per PUCCH group or PUCCH carrier. In a first approach, with a PUCCH configuration per PUCCH carrier, the HARQ-ACK codebook may be defined per PUCCH group. Accordingly, only one PUCCH at a time and carrier may be dynamic. In a second approach, with a PUCCH configuration per PUCCH carrier, the HARQ-ACK codebook may be defined per PUCCH carrier. Within the same PUCCH group, the HARQ-ACK codebooks may be as many as the number of PUCCH carriers. In case there is an overlap in time, a UE (e.g., UE 110) may have an issue in transmitting simultaneous PUCCHs, and hence some restrictions may be required.

It is noteworthy that, with respect to HARQ codebook segmentation, there is one potential codebook per each slot or sub-slot on each CC. The DCI needs to select a potential codebook for acknowledgement (ACK) and negative acknowledgement (NACK) by specifying a CC and a sub-slot on that CC. However, it is possible that one codebook might be used for another PUCCH transmission in parallel with another codebook. Moreover, a given CC might be overridden by another CC. Under a proposed scheme in accordance with the present disclosure, with respect to the issue of CC overriding, a given CC (e.g., CC "A") cannot be overridden, which is similar to having two separate PUCCH groups. The mapping from another CC (e.g., CC "D") to CC "A" may be dynamic as CC "A" travels in the DCI. Alternatively, CC "A" may be overridden, which is similar to having a single PUCCH group. Accordingly, a PUCCH may be overridden by another PUCCH scheduled before the guard.

Under a proposed scheme in accordance with the present disclosure, the K1 field in a DCI carried in a physical downlink control channel (PDCCH) on CC "D" may be an index to a row to the K1 set configured with PUCCH configuration on CC "A", with "A" being different from "D". Regarding the definition of K1, separate one or more K1 sets may be defined for each CC. That is, each K1 set may be interpreted in UL sub-slots according to the partitioning and numerology on that CC, selected by "A" (field in DCI). Alternatively, a common K1 set may be used. It is noteworthy that the value of K1 indicates an offset between a DL slot where data is scheduled on physical downlink shared channel (PDSCH) and a UL slot where an ACK (or NACK) feedback for the scheduled PDSCH data needs to be sent.

Under a proposed scheme in accordance with the present disclosure, with respect to DCI bit-field for K1 indication, a size of the K1 bit-field in the DCI (format 1_2, format 1_1) may be determined based on the largest K1_list in a PUCCH group. Under the proposed scheme, the bit-field may be padded with one or more zero bits in case a shorter list is used.

Under a proposed scheme in accordance with the present disclosure, there may be several options to achieve simultaneous PUCCH transmissions across carriers. In a first option, simultaneous PUCCHs may be allowed within a PUCCH group. There is no impact on UE implementation for this option. Also, this option differentiates using the PUCCH CC index. Two different codebooks may be constructed, with one per PUCCH carrier. In a second option, for slots and/or sub-slots overlapping in time, only one slot or sub-slot may carry a PUCCH within a PUCCH group. No PUCCH overlapping across carriers in the same PUCCH group may be allowed. This may be relevant in case that one codebook construction is to remain defined per PUCCH group (not per carrier). In a third option, simultaneous PUCCHs may be allowed within a PUCCH group under certain conditions. For instance, one condition may be include slots overlapping but no PUCCH time resource overlapping. Another condition may include two HP PUCCHs.

Under a proposed scheme in accordance with the present disclosure, with respect to a DCI bit-field as a PUCCH resource indicator, three bits may be defined for DCI format 1_1 but configurable for DCI format 1_2. In a first option, the same number of bits may be configured for a "PUCCH resource indicator" bit-field for all PUCCH carriers for DCI format 1_2. In a second option, the largest number of bits may be used and zero padding may be used to align the size of the bit-field when DCI format 1_2 is scheduling PUCCH on each PUCCH carrier.

Under a proposed scheme in accordance with the present disclosure, a PUCCH carrier may be linked to a traffic priority. Under the proposed scheme, a PUCCH carrier may be semi-statically configured to send feedback for HP traffic. For instance, for a carrier with a higher numerology, the frequency of DL/UL switch may be higher. Also, the carrier with more UL opportunities may be linked to a higher traffic priority. Additionally, a PUCCH carrier may be semi-statically configured to send feedback for a LP traffic. Under the proposed scheme, the PUCCH carrier may be implicitly determined from a priority field.

It is noteworthy that carrier switching for PUCCH transmissions may require extra processing, especially when the carrier is changed very dynamically (e.g., by the last DCI). Under a proposed scheme in accordance with the present disclosure, UE processing time N1 may be relaxed for dynamic PUCCH. That is, N1+d may be utilized instead of N1, with d being dependent on the number of PUCCH carriers per PUCCH group. For instance, in an event that the last PDSCH is N1 from PUCCH, N1 may be related to N1+d.

Under a proposed scheme in accordance with the present disclosure, in an event that a PUCCH transmission is overlapping with a high-priority physical uplink shared channel (HP-PUSCH), dynamic PUCCH may be used as an alternative to select a different PUCCH carrier to avoid dropping or multiplexing in some scenarios. That is, intra-UE multiplexing with dynamic PUCCH may be avoided.

It is noteworthy that, in case that a transmitted PUCCH includes only HARQ-ACK feedback, then selection of the PUCCH resources may be done by first selecting the resource set based on the UCI payload and then selecting the PUCCH resource within the PUCCH resource set using the PUCCH resource indicator (PRI) bit-field in the DCI and the first control channel element (CCE) associated with the PDCCH carrying the DCI. Under a proposed scheme in accordance with the present disclosure, the PRI used for the PUCCH resource selection may be determined from either a first DCI or a last DCI. For instance, the first DCI in the HARQ-ACK codebook construction (mapping to the slot-sub-slot) may be used. PRI overriding may not be allowed. Moreover, the last DCI in the HARQ-ACK codebook construction (mapping to the slot/sub-slot) may be used. PRI overriding may be allowed.

It is noteworthy that transmit power control (TPC) commands for a PUCCH are typically provided using DCI format 2_2 (e.g., TPC-PUCCH-RNTI). In mmWave operation, the medium access control (MAC) control element (CE) (e.g., for PUCCH spatial relation activation/deactivation) may signal to a UE (e.g., UE 110) to change the beam used for PUCCH transmission. While changing the beam, the UE may also change the power control parameter sets at the same time. Under a proposed scheme in accordance with the present disclosure, there may be several approaches to TPC for a cross-carrier dynamic PUCCH. In a first approach, there may be several options for transmit power control for a cross-carrier dynamic PUCCH. In a first option, each cell carrying a PUCCH may have its own TPC configuration (e.g., PUCCH-PowerControl) and may have its own TPC loop. In a second option, each cell carrying a PUCCH may have two levels for the configuration of TCP and/or TPC loop, namely: level 1 per PUCCH group and/or cell group, and level 2 per cell. In this option, some parameters may be defined per cell and some other parameters may be defined per PUCCH/cell group. In a third option, a single TPC configuration and/or TPC loop may be used per PUCCH/cell group. Alternatively, the cell index may be taken into consideration to select the parameters within this single TPC configuration.

Under the proposed scheme, in a second approach, for a DCI format 2_2 that is carrying the TPC command, a new DCI bit-field may be included in the DCI format 2_2 to indicate the PUCCH carrier on which the TPC command applies. Alternatively, the cell on which the DCI format 2_2 is received may indicate or otherwise map to the PUCCH cell on which the TPC command applies. A new radio network temporary identifier (RNTI) may be introduced to indicate to which PUCCH carrier the TPC command sent on DCI format 2_2 applies. In a third approach, when a UE (e.g., UE 110) changes the PUCCH carrier, the UE may automatically select the power control parameter set of the newly selected PUCCH carrier.

Illustrative Implementations

Figure 5:
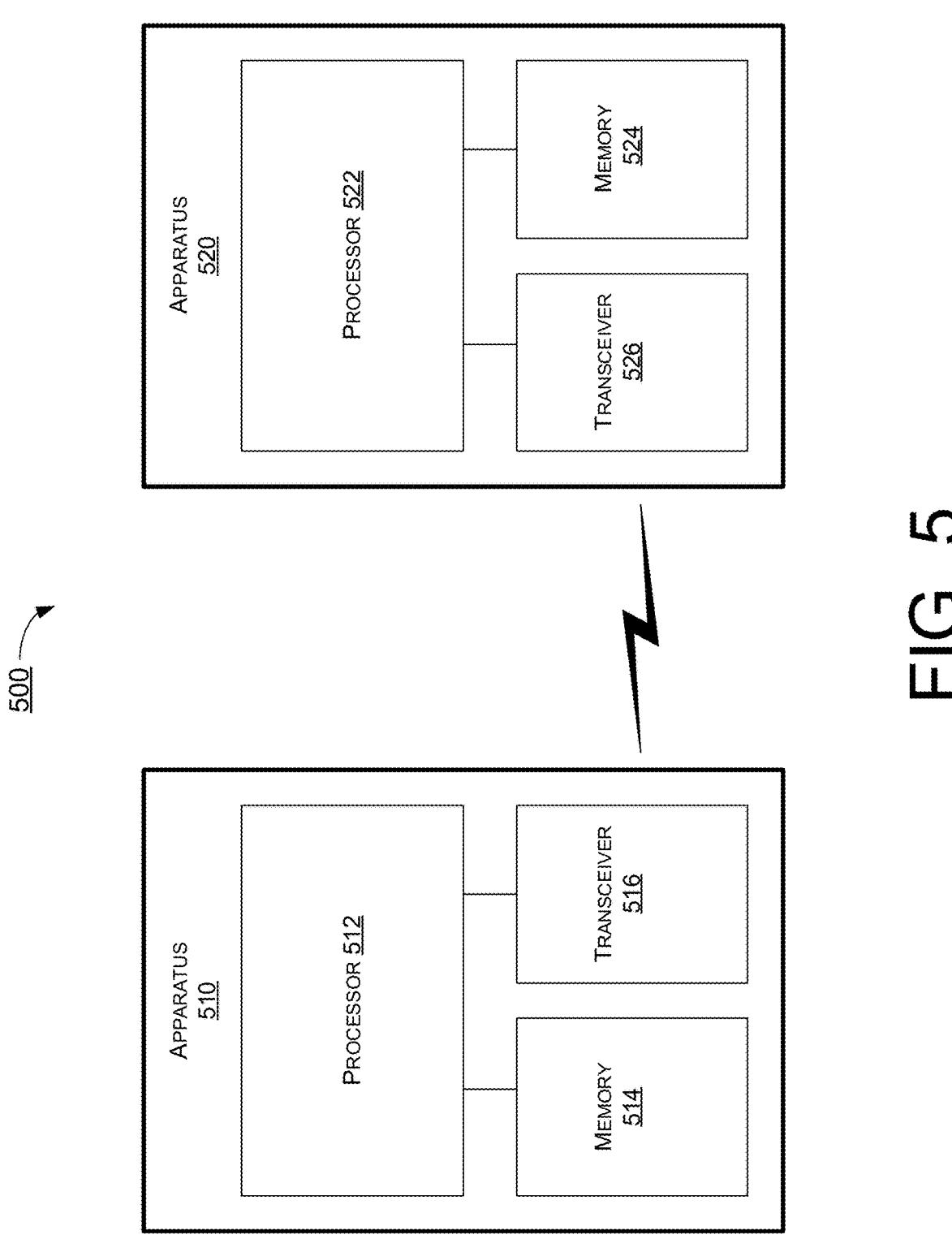
FIG. 5 is a block diagram of an example system in accordance with an implementation of the present disclosure.

FIG. 5 illustrates an example communication system 500 having a communication apparatus 510 and a network apparatus 520 in accordance with an implementation of the present disclosure. Each of communication apparatus 510 and network apparatus 520 may perform various functions to implement schemes, techniques, processes and methods described herein pertaining to dynamic and static cross-carrier PUCCH signaling and configuration in mobile communications, including scenarios/schemes described above as well as processes described below.

Communication apparatus 510 may be a part of an electronic apparatus, which may be a UE such as a portable or mobile apparatus, a wearable apparatus, a wireless communication apparatus or a computing apparatus. For instance, communication apparatus 510 may be implemented in a smartphone, a smartwatch, a personal digital assistant, a digital camera, or a computing equipment such as a tablet computer, a laptop computer or a notebook computer. Communication apparatus 510 may also be a part of a machine type apparatus, which may be an IoT, NB-IoT, IIoT or NTN apparatus such as an immobile or a stationary apparatus, a home apparatus, a wire communication apparatus or a computing apparatus. For instance, communication apparatus 510 may be implemented in a smart thermostat, a smart fridge, a smart door lock, a wireless speaker or a home control center. Alternatively, communication apparatus 510 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 510 may include at least some of those components shown in FIG. 5 such as a processor 512, for example. Communication apparatus 510 may further include one or more other components not pertinent to the proposed scheme of the present disclosure (e.g., internal power supply, display device and/or user interface device), and, thus, such component(s) of communication apparatus 510 are neither shown in FIG. 5 nor described below in the interest of simplicity and brevity.

Network apparatus 520 may be a part of an electronic apparatus/station, which may be a network node such as a base station, a small cell, a router, a gateway or a satellite. For instance, network apparatus 520 may be implemented in an eNodeB in an LTE, in a gNB in a 5G, NR, IoT, NB-IoT, IIoT, or in a satellite in an NTN network. Alternatively, network apparatus 520 may be implemented in the form of one or more IC chips such as, for example and without limitation, one or more single-core processors, one or more multi-core processors, or one or more RISC or CISC processors. Network apparatus 520 may include at least some of those components shown in FIG. 5 such as a processor 522, for example. Network apparatus 520 may further include one or more other components not pertinent to the proposed scheme of the present disclosure (e.g., internal power supply, display device and/or user interface device), and, thus, such component(s) of network apparatus 520 are neither shown in FIG. 5 nor described below in the interest of simplicity and brevity.

In one aspect, each of processor 512 and processor 522 may be implemented in the form of one or more single-core processors, one or more multi-core processors, one or more RISC processors, or one or more CISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including dynamic and static cross-carrier PUCCH signaling and configuration in mobile communications in accordance with various implementations of the present disclosure.

In some implementations, communication apparatus 510 may also include a transceiver 516 coupled to processor 512 and capable of wirelessly transmitting and receiving data. In some implementations, communication apparatus 510 may further include a memory 514 coupled to processor 512 and capable of being accessed by processor 512 and storing data therein. In some implementations, network apparatus 520 may also include a transceiver 526 coupled to processor 522 and capable of wirelessly transmitting and receiving data. In some implementations, network apparatus 520 may further include a memory 524 coupled to processor 522 and capable of being accessed by processor 522 and storing data therein. Accordingly, communication apparatus 510 and network apparatus 520 may wirelessly communicate with each other via transceiver 516 and transceiver 526, respectively.

Each of communication apparatus 510 and network apparatus 520 may be a communication entity capable of communicating with each other using various proposed schemes in accordance with the present disclosure. To aid better understanding, the following description of the operations, functionalities and capabilities of each of communication apparatus 510 and network apparatus 520 is provided in the context of a mobile communication environment in which communication apparatus 510 is implemented in or as a communication apparatus or a UE (e.g., UE 110) and network apparatus 520 is implemented in or as a network node or base station (e.g., network node 125) of a communication network (e.g., wireless network 120). It is also noteworthy that, although the example implementations described below are provided in the context of mobile communications, the same may be implemented in other types of networks.

Under various proposed schemes pertaining to dynamic and static cross-carrier PUCCH signaling and configuration in mobile communications in accordance with the present disclosure, with communication apparatus 510 implemented in or as UE 110 and network apparatus 520 implemented in or as network node 125 in network environment 100, processor 512 of communication apparatus 510 may select a CC from a plurality of CCs with a static approach or a dynamic approach. Additionally, processor 512 may perform, via transceiver 516, a PUCCH transmission to a network (e.g., network 120 via apparatus 520 as network node 125) using the selected CC.

In some implementations, each of the plurality of CCs may be associated with a respective priority index. Accordingly, in selecting the CC from the plurality of CCs, processor 512 may select, for a time slot, one of the plurality of CCs according to an order of priority of the respective priority indices of the plurality of CCs. In some implementations, in selecting the one of the plurality of CCs according to the order of priority of the respective priority indices of the plurality of CCs, processor 512 may perform certain operations. For instance, processor 512 may select a first CC of the plurality of CCs having a first priority index. Optionally processor 512 may select a second CC of the plurality of CCs having a second priority index in an event that the first CC is not available on the time slot. In such cases, a value of the second priority index may be different from a value of the first priority index by 1 (e.g., incremented by 1).

In some implementations, in selecting the CC from the plurality of CCs, processor 512 may select the CC based on dynamic signaling with DCI from the network. In some implementations, the dynamic signaling may include a plurality of DCI signals received from the network. In such cases, in selecting the CC based on the dynamic signaling from the network, processor 512 may perform one of the following: (a) selecting the CC from the plurality of CCs based on a first received DCI signal of the plurality of DCI signals received from the network; (b) selecting the CC from the plurality of CCs based on a last received DCI signal of the plurality of DCI signals received from the network; or (c) selecting the CC from the plurality of CCs based on a last DCI signal of the plurality of DCI signals before a deadline.

In some implementations, a respective PUCCH configuration may be configured per PUCCH carrier for each BWP of a plurality of BWPs in an operating bandwidth.

In some implementations, a respective HARQ codebook may be either defined for each PUCCH carrier of a plurality of PUCCH carriers or defined per PUCCH group comprising the plurality of CCs.

In some implementations, one or more separate K1 sets may be defined for each PUCCH carrier of a plurality of PUCCH carriers. In some implementations, for each PUCCH carrier of the plurality of PUCCH carriers, each of the one or more separate K1 sets may be interpreted in UL sub-slots according to partitioning and numerology on that PUCCH carrier.

In some implementations, in performing the PUCCH transmission, processor 512 may perform certain operations. For instance, processor 512 may receive DCI from the network. Additionally, processor 512 may determine a size of a k1 bit-field in the DCI based on a largest list among a plurality of lists in a PUCCH group comprising the plurality of CCs.

In some implementations, in performing the PUCCH transmission, processor 512 may perform certain operations. For instance, processor 512 may receive DCI from the network. Additionally, processor 512 may pad the k1 bit-field in the DCI in an event that a shorter list among a plurality of lists in a PUCCH group comprising the plurality of CCs is used.

In some implementations, in performing the PUCCH transmission, processor 512 may perform the PUCCH transmission with no PUCCH slots overlapping in time across carriers in a same PUCCH group comprising the plurality of CCs.

In some implementations, in performing the PUCCH transmission, processor 512 may perform certain operations. For instance, processor 512 may receive a DCI signal from the network. Furthermore, processor 512 may, in an event that a DCI format 1_2 is used in the DCI signal, align a size of a PRI bit-field by using a largest number of bits with zero padding.

In some implementations, in performing the PUCCH transmission, processor 512 may perform certain operations. For instance, processor 512 may switch to a different CC of the plurality of CCs as a PUCCH carrier. Additionally, processor 512 may relax a processing time in dynamic PUCCH selection to result in a relaxed processing time which is longer than an original processing time without the relaxing by a delta time. In some implementations, the delta time may depend on a number of PUCCH carriers per PUCCH group.

In some implementations, in selecting the CC from the plurality of CCs, processor 512 may perform certain operations. For instance, processor 512 may determine a PRI based on either of the following: (a) a first DCI signal in a HARQ-ACK construction; or (b) a last DCI signal in the HARQ-ACK construction. Moreover, processor 512 may select the CC from the plurality of CCs using the PRI.

In some implementations, each PUCCH-carrying cell may have a respective TPC configuration. Alternatively, each PUCCH-carrying cell may have a respective TPC configuration and a respective TPC loop.

In some implementations, in performing the PUCCH transmission, processor 512 may perform certain operations. For instance, processor 512 may receive a DCI format 2_2 from the network, with the DCI format 2_2 including a TPC command and a DCI bit-field indicating which PUCCH carrier on which the TPC command applies. Moreover, processor 512 may apply the TPC command on one of the plurality of CCs selected as the PUCCH carrier.

In some implementations, in performing the PUCCH transmission, processor 512 may perform additional operations. For instance, processor 512 may switch to another CC of the plurality of CCs as a new PUCCH carrier. Moreover, processor 512 may select a set of power control parameters corresponding to the new PUCCH carrier. Furthermore, processor 512 may apply the set of power control parameters to the new PUCCH carrier.

Illustrative Processes

Figure 6:
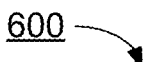
FIG. 6 is a flowchart of an example process in accordance with an implementation of the present disclosure.

FIG. 6 illustrates an example process 600 in accordance with an implementation of the present disclosure. Process 600 may be an example implementation of schemes described above whether partially or completely, with respect to dynamic and static cross-carrier PUCCH signaling and configuration in mobile communications in accordance with the present disclosure. Process 600 may represent an aspect of implementation of features of communication apparatus 510 and network apparatus 520. Process 600 may include one or more operations, actions, or functions as illustrated by one or more of blocks 610 and 620. Although illustrated as discrete blocks, various blocks of process 600 may be divided into additional blocks, combined into fewer blocks, or eliminated, depending on the desired implementation. Moreover, the blocks of process 600 may executed in the order shown in FIG. 6 or, alternatively, in a different order. Process 600 may be implemented by communication apparatus 510 or any suitable UE or machine type devices as well as by and network apparatus 520 or any suitable network node or base station. Solely for illustrative purposes and without limitation, process 600 is described below in the context of communication apparatus 510 implemented in or as UE 110 and network apparatus 520 implemented in or as network node 125. Process 600 may begin at block 610.

At 610, process 600 may involve processor 512 of communication apparatus 510, implemented in or as UE 110, selecting a CC from a plurality of CCs with a static approach or a dynamic approach. Process 600 may proceed from 610 to 620.

At 620, process 600 may involve processor 512 performing, via transceiver 516, a PUCCH transmission to a network (e.g., network 120 via apparatus 520 as network node 125) using the selected CC.

In some implementations, each of the plurality of CCs may be associated with a respective priority index. Accordingly, in selecting the CC from the plurality of CCs, process 600 may involve processor 512 selecting, for a time slot, one of the plurality of CCs according to an order of priority of the respective priority indices of the plurality of CCs. In some implementations, in selecting the one of the plurality of CCs according to the order of priority of the respective priority indices of the plurality of CCs, process 600 may involve processor 512 performing certain operations. For instance, process 600 may involve processor 512 selecting a first CC of the plurality of CCs having a first priority index. Optionally, process 600 may also involve processor 512 selecting a second CC of the plurality of CCs having a second priority index in an event that the first CC is not available on the time slot. In such cases, a value of the second priority index may be different from a value of the first priority index by 1 (e.g., incremented by 1).

In some implementations, in selecting the CC from the plurality of CCs, process 600 may involve processor 512 selecting the CC based on dynamic signaling with DCI from the network. In some implementations, the dynamic signaling may include a plurality of DCI signals received from the network. In such cases, in selecting the CC based on the dynamic signaling from the network, process 600 may involve processor 512 performing one of the following: (a) selecting the CC from the plurality of CCs based on a first received DCI signal of the plurality of DCI signals received from the network; (b) selecting the CC from the plurality of CCs based on a last received DCI signal of the plurality of DCI signals received from the network; or (c) selecting the CC from the plurality of CCs based on a last DCI signal of the plurality of DCI signals before a deadline.

In some implementations, a respective PUCCH configuration may be configured per PUCCH carrier for each BWP of a plurality of BWPs in an operating bandwidth.

In some implementations, a respective HARQ codebook may be either defined for each PUCCH carrier of a plurality of PUCCH carriers or defined per PUCCH group comprising the plurality of CCs.

In some implementations, one or more separate K1 sets may be defined for each PUCCH carrier of a plurality of PUCCH carriers. In some implementations, for each PUCCH carrier of the plurality of PUCCH carriers, each of the one or more separate K1 sets may be interpreted in UL sub-slots according to partitioning and numerology on that PUCCH carrier.

In some implementations, in performing the PUCCH transmission, process 600 may involve processor 512 performing certain operations. For instance, process 600 may involve processor 512 receiving DCI from the network. Additionally, process 600 may involve processor 512 determining a size of a k1 bit-field in the DCI based on a largest list among a plurality of lists in a PUCCH group comprising the plurality of CCs.

In some implementations, in performing the PUCCH transmission, process 600 may involve processor 512 performing certain operations. For instance, process 600 may involve processor 512 receiving DCI from the network. Additionally, process 600 may involve processor 512 padding a k1 bit-field in the DCI in an event that a shorter list among a plurality of lists in a PUCCH group comprising the plurality of CCs is used.

In some implementations, in performing the PUCCH transmission, process 600 may involve processor 512 performing the PUCCH transmission with no PUCCH slots overlapping in time across carriers in a same PUCCH group comprising the plurality of CCs.

In some implementations, in performing the PUCCH transmission, process 600 may involve processor 512 performing certain operations. For instance, process 600 may involve processor 512 receiving a DCI signal from the network. Furthermore, process 600 may involve processor 512, in an event that a DCI format 1_2 is used in the DCI signal, aligning a size of a PRI bit-field by using a largest number of bits with zero padding.

In some implementations, in performing the PUCCH transmission, process 600 may involve processor 512 performing certain operations. For instance, process 600 may involve processor 512 switching to a different CC of the plurality of CCs as a PUCCH carrier. Additionally, process 600 may involve processor 512 relaxing a processing time in dynamic PUCCH selection to result in a relaxed processing time which is longer than an original processing time without the relaxing by a delta time. In some implementations, the delta time may depend on a number of PUCCH carriers per PUCCH group.

In some implementations, in selecting the CC from the plurality of CCs, process 600 may involve processor 512 performing certain operations. For instance, process 600 may involve processor 512 determining a PRI based on either of the following: (a) a first DCI signal in a HARQ-ACK construction; or (b) a last DCI signal in the HARQ-ACK construction. Moreover, process 600 may involve processor 512 selecting the CC from the plurality of CCs using the PRI.

In some implementations, each PUCCH-carrying cell may have a respective TPC configuration. Alternatively, each PUCCH-carrying cell may have a respective TPC configuration and a respective TPC loop.

In some implementations, in performing the PUCCH transmission, process 600 may involve processor 512 performing certain operations. For instance, process 600 may involve processor 512 receiving a DCI format 2_2 from the network, with the DCI format 2_2 including a TPC command and a DCI bit-field indicating which PUCCH carrier on which the TPC command applies. Moreover, process 600 may involve processor 512 applying the TPC command on one of the plurality of CCs selected as the PUCCH carrier.

In some implementations, in performing the PUCCH transmission, process 600 may involve processor 512 performing additional operations. For instance, process 600 may involve processor 512 switching to another CC of the plurality of CCs as a new PUCCH carrier. Moreover, process 600 may involve processor 512 selecting a set of power control parameters corresponding to the new PUCCH carrier. Furthermore, process 600 may involve processor 512 applying the set of power control parameters to the new PUCCH carrier.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

The invention claimed is:

1. A method, comprising:

selecting, by a processor of an apparatus implemented in a user equipment (UE), a component carrier (CC) from a plurality of CCs; and performing, by the processor, a physical uplink control channel (PUCCH) transmission to a network using the selected CC, wherein the performing of the PUCCH transmission comprises:

receiving downlink control information (DCI) from the network; and either:

determining a size of a k1 bit-field in the DCI based on a largest list among a plurality of lists in a PUCCH group comprising the plurality of CCs; or padding the k1 bit-field in the DCI in an event that a shorter K1 list among the plurality of lists in the PUCCH group comprising the plurality of CCs is used.

2. The method of claim 1, wherein each of the plurality of CCs is associated with a respective priority index, and wherein the selecting of the CC from the plurality of CCs comprises selecting, for a time slot, one of the plurality of CCs according to an order of priority of the respective priority indices of the plurality of CCs.

3. The method of claim 2, wherein the selecting of the one of the plurality of CCs according to the order of priority of the respective priority indices of the plurality of CCs comprises:

selecting a first CC of the plurality of CCs having a first priority index; and selecting a second CC of the plurality of CCs having a second priority index in an event that the first CC is not available on the time slot, wherein a value of the second priority index is different from a value of the first priority index by 1.

4. The method of claim 1, wherein the selecting of the CC from the plurality of CCs comprises selecting the CC based on dynamic signaling with downlink control information (DCI) from the network.

5. The method of claim 4, wherein the dynamic signaling comprises a plurality of DCI signals received from the network, and wherein the selecting of the CC based on the dynamic signaling from the network comprises selecting the CC from the plurality of CCs based on a first received DCI signal of the plurality of DCI signals received from the network.

6. The method of claim 4, wherein the dynamic signaling comprises a plurality of DCI signals received from the network, and wherein the selecting of the CC based on the dynamic signaling from the network comprises selecting the CC from the plurality of CCs based on a last received DCI signal of the plurality of DCI signals received from the network.

7. The method of claim 4, wherein the dynamic signaling comprises a plurality of DCI signals received from the network, and wherein the selecting of the CC based on the dynamic signaling from the network comprises selecting the CC from the plurality of CCs based on a last DCI signal of the plurality of DCI signals before a deadline.

8. The method of claim 1, wherein a respective PUCCH configuration is configured per PUCCH carrier for each bandwidth part (BWP).

9. The method of claim 1, wherein a respective hybrid automatic repeat request (HARQ) codebook is either defined for each PUCCH carrier of a plurality of PUCCH carriers or defined per PUCCH group comprising the plurality of CCs.

10. The method of claim 1, wherein one or more separate K1 sets are defined for each PUCCH carrier of a plurality of PUCCH carriers, and wherein, for each PUCCH carrier of the plurality of PUCCH carriers, each of the one or more separate K1 sets is interpreted in uplink (UL) sub-slots according to partitioning and numerology on that PUCCH carrier.

11. The method of claim 1, wherein the performing of the PUCCH transmission comprises performing the PUCCH transmission with no PUCCH slots overlapping in time across carriers in a same PUCCH group comprising the plurality of CCs.

12. The method of claim 1, wherein the performing of the PUCCH transmission comprises:

receiving a downlink control information (DCI) signal from the network;

in an event that a DCI format 1_2 is used in the DCI signal, aligning a size of a PUCCH resource indicator (PRI) bit-field by using a largest number of bits with zero padding.

13. The method of claim 1, wherein the performing of the PUCCH transmission comprises:

switching to a different CC of the plurality of CCs as a PUCCH carrier; and relaxing a processing time in dynamic PUCCH selection to result in a relaxed processing time which is longer than an original processing time without the relaxing by a delta time, wherein the delta time depends on a number of PUCCH carriers per PUCCH group.

14. The method of claim 1, wherein the selecting of the CC from the plurality of CCs comprises:

determining a PUCCH resource indicator (PRI) based on:

a first downlink control information (DCI) signal in a hybrid automatic repeat request acknowledgement (HARQ-ACK) construction; or a last DCI signal in the HARQ-ACK construction; and selecting the CC from the plurality of CCs using the PRI.

15. The method of claim 1, wherein each PUCCH carrier has a respective transmit power control (TPC) configuration.

16. The method of claim 1, wherein each PUCCH carrier has a respective transmit power control (TPC) configuration and a respective TPC loop.

17. The method of claim 1, wherein the performing of the PUCCH transmission comprises:

receiving a downlink control information (DCI) format 2_2 from the network, the DCI format 2_2 comprising a transmit power control (TPC) command and a DCI bit-field indicating which PUCCH carrier on which the TPC command applies; and applying the TPC command on one of the plurality of CCs selected as the PUCCH carrier.

18. The method of claim 17, wherein the performing of the PUCCH transmission further comprises:

switching to another CC of the plurality of CCs as a new PUCCH carrier;

selecting a set of power control parameters corresponding to the new PUCCH carrier; and applying the set of power control parameters to the new PUCCH carrier.

\* \* \* \* \*